United States Patent [19]

Sudo et al.

[11] Patent Number: 4,501,626

[45] Date of Patent: Feb. 26, 1985

[54] HIGH STRENGTH STEEL PLATE AND METHOD FOR MANUFACTURING SAME

[75] Inventors: Masatoshi Sudo, Kobe; Hiromi Hori, Akashi; Takafusa Iwai, Akashi; Akinori Ohtomo, Akashi; Denei Takai, Kakogawa, all of Japan

[73] Assignee: Kabushiki Kaisha Kobe Seiko Sho, Kobe, Japan

[21] Appl. No.: 311,598

[22] Filed: Oct. 15, 1981

[30] Foreign Application Priority Data

| | | |
|---|---|---|
| Oct. 17, 1980 [JP] | Japan | 55-146020 |
| Dec. 26, 1980 [JP] | Japan | 55-187196 |
| Jan. 20, 1981 [JP] | Japan | 56-7598 |
| Mar. 3, 1981 [JP] | Japan | 56-30872 |

[51] Int. Cl.$^3$ .......................... C21D 9/48; C21D 8/04
[52] U.S. Cl. ...................... 148/36; 148/12 F
[58] Field of Search ............... 148/12 F, 12.4, 36

[56] References Cited

U.S. PATENT DOCUMENTS

| | | | |
|---|---|---|---|
| 4,072,543 | 2/1978 | Coldren et al. | 148/36 |
| 4,314,862 | 2/1982 | Sudo et al. | 148/12 F |
| 4,316,753 | 2/1982 | Kaneko et al. | 148/12 F |
| 4,388,122 | 6/1983 | Sudo et al. | 148/12.4 |

FOREIGN PATENT DOCUMENTS

34659  3/1980  Japan ........................... 148/12 F

*Primary Examiner*—Peter K. Skiff
*Attorney, Agent, or Firm*—Oblon, Fisher, Spivak, McClelland & Maier

[57] ABSTRACT

There are described a high strength steel plate having a low yield ratio and improved strength-elongation balance and stretch flangeability, and a method for producing same, the steel plate containing 0.01–0.2% of C, 0.3–2.5% of Mn and 0.01–1.8% of Si and having a triple phase of polygonal ferrite, bainite and martensite, the area ratios of the bainite and martensite phases being 4–45% and 1–15%, respectively, and the area ratio of the bainite phase being greater than that of the martensite phase.

22 Claims, 8 Drawing Figures

○ TABLE 17
△ TABLE 14
(PATTERN III)

HIGH STRENGTH STEEL PLATE AND METHOD FOR MANUFACTURING SAME

BACKGROUND OF THE INVENTION (1) Field of the Invention

This invention relates to a high strength steel plate which is low in yield ratio and improved in strength-elongation balance as well as in stretch flangeability, and a method for manufacturing same. The high strength steel plate of the present invention is particularly suitable for use as a material for the wheel disc and/or wheel rim of a motor vehicle.

(2) Description of the Prior Art

Recently, various attempts are made in order to improve the mileage of motor vehicles, including the reduction of the vehicle body weight which is considered to be most effective. With regard to the reduction of the vehicle body weight, there have thus far been made many proposals concerning the use of high strength steel plates and aluminum alloys along with the reductions in size. Among these proposals, the reduction of the vehicle wheel weight is one of the most effective means for improving the mileage, and the possibilities of application of a high strength steel plate to the wheel rim or disc have been a subject of intensive studies. The high strength steel plates which have been proposed for this purpose include the composite structure steel plate (dual phase steel plate of ferrite+martensite, which is low in yield ratio and has higher elongation as compared with the strength, showing excellent properties in formability and shape fixability. However, the steel plate of this sort is inferior in stretch flangeability so that, if applied to the vehicular wheel disc or the like, it gives rise to problems such as:

(1) the occurrence of cracking at an expanded hole portion in the disc forming operation; or (2) the occurrence of cracking at an expanded hole portion in the fatigue test or in the running test.

The present inventors have studied in detail the relationship between the steel structure and stretch flangeability for the improvement thereof, and as a result found that a steel plate of a ferrite+bainite structure is superior to a dual phase steel plate of ferrite+martensite in the stretch flangeability, as disclosed in our Japanese Patent Application Nos. 54-171594 and 55-33155. However, the steel plate of the ferrite+bainite structure has a drawback that it is inferior in the strength-elongation balance.

Further, the wheel rim requires the resistance weldability in addition to the stretch flangeability which is required by the wheel disc. Another problem which is encountered in applying a high strength steel plate to the wheel rim is the cracking which takes place at a high rate in the roll-forming operation subsequent to the flash butt welding, the cracks occurring at a rate as high as about 50% in the thermally affected zones in the forming stage. Such a high rate of cracking is detrimental to actual applications.

SUMMARY OF THE INVENTION

The present invention aims at rational elimination of the above-mentioned drawbacks and problems of the prior art. More specifically, it is a primary object of the present invention to provide a high strength steel plate which has a low yield ratio and good strength-elongation balance characteristic to the dual phase steel plate of ferrite+martensite along with the excellent stretch flangeability comparable to that of the ferrite+bainite steel, and a method for manufacturing such high strength steel plates.

It is another object of the present invention to provide a high strength steel plate which, besides the above-mentioned properties, possesses excellent resistance weldability, and a method for manufacturing same.

Still another object of the present invention is to provide a high strength steel plate which is particularly suitable for use as a material for wheel discs and/or wheel rims of motor vehicles, and a method for manufacturing same.

According to one aspect of the present invention, the above-mentioned objects are achieved by a high strength steel plate which has low yield ratio and excellent strength-elongation balance and stretch flangeability, the steel plate containing 0.01–0.2% of C, 0.3–2.5% of Mn and 0.01–1.8% of Si and having a tripple phase structure of polygonal ferrite, bainite and martensite with a bainite areal ratio of 4–45% and a martensite areal ratio of 1–15%, the bainite areal rate being greater than the martensite areal rate.

According to another aspect of the present invention, there is provided a method for producing a high strength steel plate as stated above, which method comprising:

(1) subjecting a steel containing 0.01–0.2% of C, 0.3–2.5% of Mn and 0.01–1.8% of Si to a hot rolling-cooling treatment selected from the group consisting of;

(i) hot rolling the steel at a fininshing rolling temperature above $Ar_3$ point, followed by cooling the hot rolled steel from the finishing rolling temperature to a temperature range between point $Ar_3$ and point $Ar_1$ at an average cooling speed of 3°–70° C./sec, (ii) hot rolling the steel at a finishing rolling temperature above $Ar_3$ point, followed by cooling the hot rolled steel from the finishing rolling temperature to a temperature range between point $Ar_3$ and point $Ar_1$ at an average cooling speed of 3°–70° C./sec and then by air cooling ar slow cooling for 2–20 seconds from the temperature range of $Ar_3$ to $Ar_1$, and (iii) hot rolling the steel at a finishing rolling temperature range of $Ar_3$ to $Ar_1$, followed by air cooling or slow cooling the hot rolled steel for 2–20 seconds from the temperature range of $Ar_3$ to $Ar_1$, thereafter (2) cooling the steel thus subjected to hot rolling-cooling treatment to a temperature below 550° C. at an average cooling speed not lower than 20° C./sec, and (3) taking up the cooled steel.

Further embodiments of the present invention will become apparent from the particular description of the invention which follows.

BRIEF DESCRIPTION OF THE DRAWINGS

A more complete appreciation of the invention and many of the attendant advantages thereof will be readily attained as the same becomes better understood by reference to the following detailed description when taken in conjunction with the accompanying drawings, in which.

DESCRIPTION OF PREFERRED EMBODIMENTS

The term "bainite" as used in the present invention means mainly the bainitic ferrite but includes the bainite which partly contains the so-called accicular ferrite or a a carbide. The term "martensite" also includes partly retained austenite.

Figure 1:
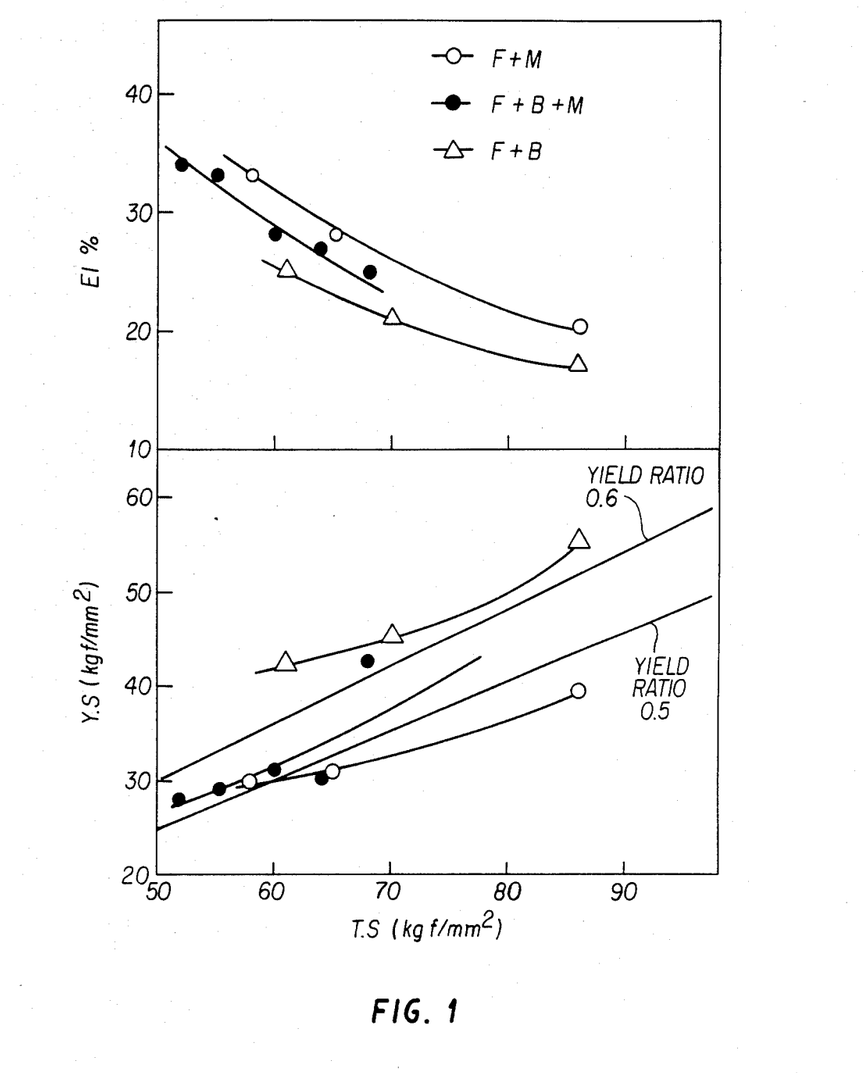
FIG. 1 is a diagram showing the relationship between tensile strength and total elongation and the relationship between tensile strength and yield stress.

It is important in the present invention that the composite structure consists of tripple phases of polygonal ferrite, bainite and martensite. More particularly, as known from FIG. 1 depicting an embodiment which will be described hereinlater, the yield ratio is minimum with the ferrite+martensite steel and maximum with the ferrite+bainite steel. The yield ratio is lowered as the polygonal ferrite is introduced into the ferrite+bainite steel, and it is further lowered to a value comparable to that of the ferrite+martensite steel when a small amount of martensite is introduced to for a tripple-phase structure of polygonal ferrite+bainite+martensite.

Similarly to the yield ratio, the tripple-phase steel of polygonal ferrite+bainite+martensite shows a good balance of strength-elongation which is akin to the value of the ferrite+martensite steel, as shown in FIG. 1.

Figure 2:
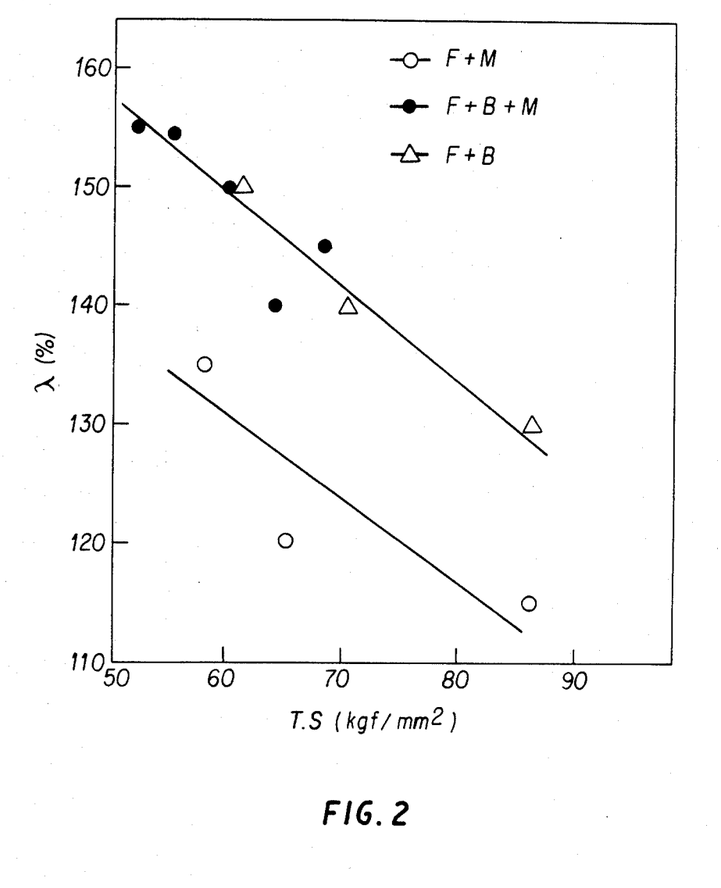
FIG. 2 is a diagram showing the relationship between tensile strength and hole expanding limit.

With regard to the hole expansibility (the index of the flanging extensibility), the steel of ferrite+martensite is the worst and the ferrite+bainite steel is the best as shown in FIG. 2. On the other hand, the tripple-phase steel of polygonal ferrite+bainite+martensite shows a high value of hole expansibility approximate to the value of the ferrite+bainite steel.

Turning now to the fatigue strength, the tripple-phase steel of polygonal ferrite+bainite+martensite shows a value similar to the ferrite+bainite steel and is superior to the ferrite+martensite steel.

As known from the foregoing date, the tripple-phase steel of polygonal ferrite+bainite+martensite simultaneously possesses only the advantages of the ferrite+martensite steel and the ferrite bainite steel, and is excellent in all of the properties of the strength-elongation balance, stretch flangeability and fatigue strength.

It is also known from these examples that, in the tripple-phase steel structure according to the present invention, the area ratio of bainite should be in the range of 4–45% since a rate over 45% results in a drop in the effect of lowering the yield ratio due to introduction of martensite and a rate below 4% makes no difference from the ferrite+martensite steel. The area ratio of bainite is preferred to be in the range of 6–35%.

Figure 4:
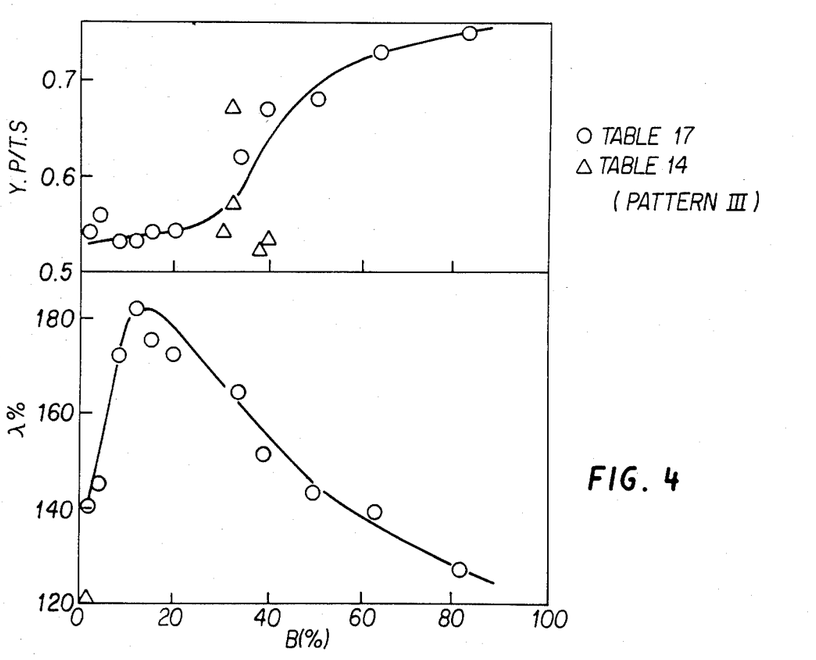
FIG. 4 is a diagram showing the relationship between the bainite area rate and yield ratio and the relationship between the bainite area rate and the hole expanding limit.

More particularly, referring to FIG. 4 which shows the relationship between the bainite area ratio and the yield ratio and the relationship between the bainite area ratio and the hole expansibility which is the index of the stretch flangeability, plotting the pattern III of Example 4 (denoted by mark "Δ") and Example 5 (denoted by mark "O") which will be described hereinlater. A material for the wheel disc and/or wheel rim of the motor vehicle is required to have a stretch flangeability higher than 150%, preferably higher than 160% in the forming stage, with a yield ratio lower than 0.7 and preferably lower than 0.6. As clear from the experimental data of FIG. 4, intensive studies conducted by the present inventors revealed the value of the bainite area ratio suitable for the yield ratio and the stretch flangeability which are required for the material to be used for the vehicular wheel disc and/or wheel rim. According to FIG. 4, the bainite area ratio should be in the range of 4–45%.

Figure 5:
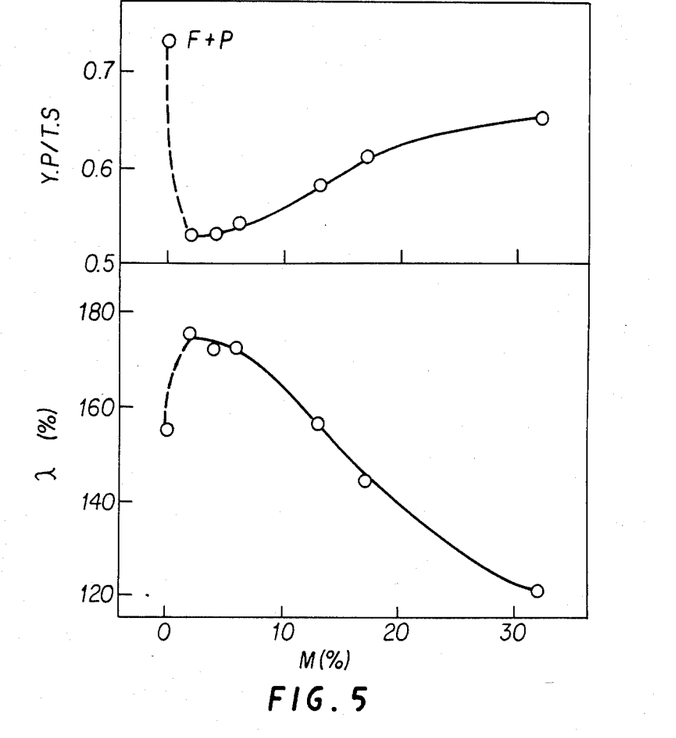
FIG. 5 is a diagram showing the relationship between the martensite area rate and hole expanding limit and the relationship between the martensite area rate and the yield ratio.

FIG. 5 plots the relationship between the martensite area rate and the stretch flangeability and the relationship between the martensite area rate and the yield ratio in the specimens 46, 47 and 53 to 57 which will be explained hereinlater. Similarly to the bainite area ratio mentioned above, the martensite area rate should be held in the range of 1–15%. As clear from FIG. 5, the yield ratio is increased if the martensite area rate exceeds 15% and it becomes difficult to attain hole expansibility greater than 150%. On the contrary, with a martensite area ratio smaller than 1%, the effect of martensite introduction becomes smaller. The martensite area rate should be in the range which guarantees a hole expansibility over 160% and a yield ratio below 0.6, namely, in the range of 1–10%.

Figure 3:
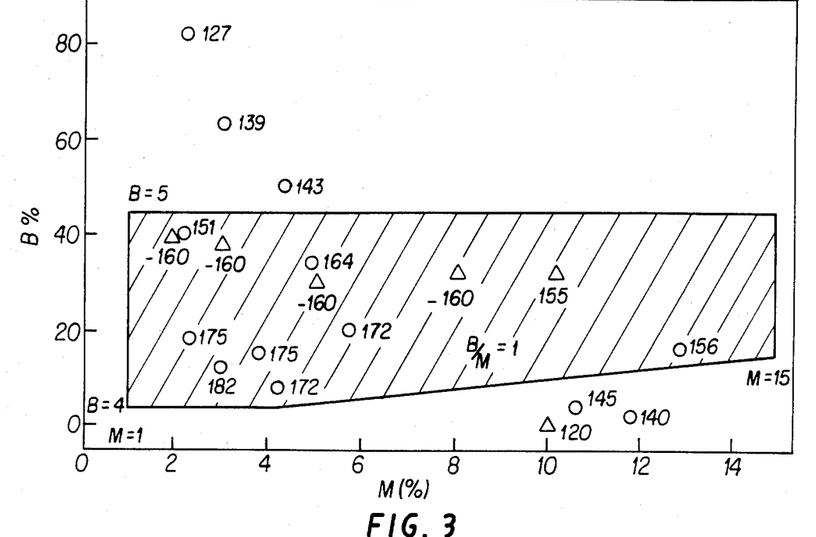
FIG. 3 is a diagram showing the relationship between martensite area rate and bainite area rate.

As seen in FIG. 3 which plots the correlation between the martensite area ratio and the bainite area ratio in relation with the hole expansibility, more particularly, the pattern III of Example 4 (denoted by mark "Δ") and Example 5 (denoted by mark "O") which will appear hereinlater, the bainite area ratio in the tripple-phase steel structure according to the present invention should be greater than the martensite area ratio in order to secure hole expansibility greater than 150%, in addition to the above-defined conditions that the bainite and martensite area ratios should be respectively in the ranges of 4–45% and 1–15%. The range which satisfies these conditions is indicated by hatching in FIG. 3.

Figure 6:
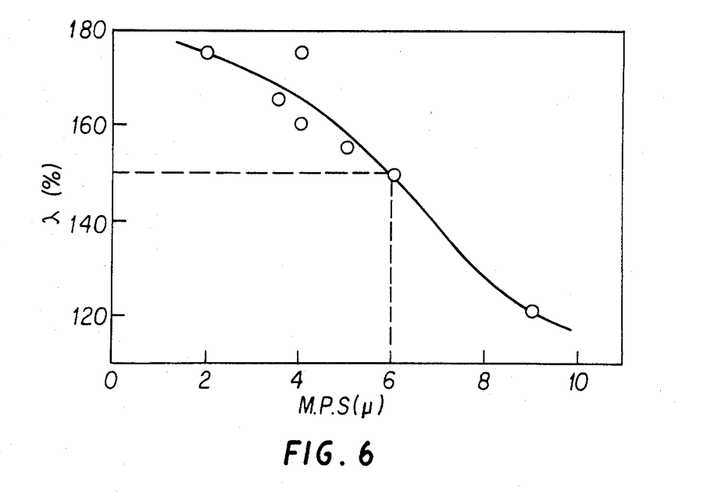
FIG. 6 is a diagram showing the relationship between the average diameter of martensite particle size and the hole expanding limit.

FIG. 6 is a plot of the relationship between the particle size of the martensite and the hole expansibility, more particularly, a plot of the results of experiments of Table 20 using the composite steel structures of Table 19. The hole expansibility is also dependent on the average diameter of the martensite as shown in FIG. 6. More specifically, this figure shows that the hole expansibility is further improved by making the martensite finer even if the area ratios of the bainite and martensite are in the above-defined ranges, namely, that the hole expansibility becomes greater than 150% when the average particle size of the martensite is smaller than 6 microns. The hole expansibility is further improved as the grain size is reduced to a value smaller than 5 microns and improved in a greater degree with a value smaller than 4 microns.

It will be appreciated from the foregoing description that, with the tripple-phase steel structure according to the present invention, it is possible to guarantee a low yield ratio along with excellent strength-elongation balance and stretch flangeability by controlling the area rates of the bainite and martensite, and that the stretch flangeability can be further enhanced by making the martensite finer.

Figure 7:
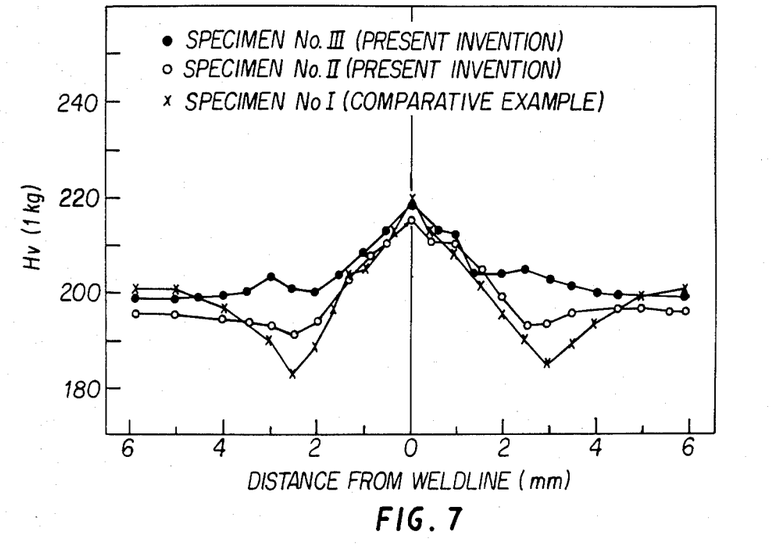
FIG. 7 is a diagram showing the hardness distribution in a weld portion after flash-butt welding.

As already stated hereinbefore, one problem which is encountered when applying a steel plate to a vehicular wheel rim is the softening of the thermally influenced portions after the flash-butt welding, which occurs conspicuously degree in the ferrite+martensite steel as a result of decomposition of the martensite, the thermally influenced portions giving rise to cracks in the subsequent roll-forming stage in such a degree as to make the application of the ferrite+martensite steel utterly difficult. The softening of the thermally influenced portion, however, is not observed in the steel of the bainite structure, and the problem of cracking in the cold-rolling (roll-forming) subsequent to the welding operation is precluded, as proposed in the above-mentioned prior application (Japanese Patent Application No. 54-171594). In order to overcome the drawback of the ferrite+bainite structure steel, the present inventors conducted a comprehensive study varying the proportions of the ferrite+bainite+martensite structures in relation with the chemical components involved. As a result, it has been found that, as shown in FIG. 7, the steel of ferrite+martensite structure has an excellent softening resistance similarly to the ferrite+bainite structure steel, even in the case of spot welding. It has also been revealed that a slightly softened state can be established by letting a stable precipitant like NbC or the like exist in the thermally affected zone or more positively leaving Nb in solid solution of after the hot-rolling for precipitating same in the thermally affected zone, thereby preventing the initiation of cracking from the thermally influenced portion in the succeeding roll-forming operation.

The adjustment of the steel structure is attained by controlling the cooling condition during and after the hot-rolling or by further controlling the annealing conditions either (either continuous or batch annealing) in the subsequent stage, in connection with the chemical components which are discussed hereinafter.

The limitations of the respective chemical components in the present invention are based on the following reasons.

The component C is an element which is essential for maintaining the required strength and for forming the low temperature transformation products like bainite and martensite but its content should be limited since a C-content in excess of 0.2% will cause a considerable deterioration in ductility and impair the weldability (giving rise to a drop in hardness of butt faces due to decarburization in the butt welding, resulting in a large difference in hardness between the weld line and the adjacent portions). In a case where forming workability is required in particular, its content should desirably be less than 0.09%. The lower limit of the C-content should be 0.01 in order to secure the effects of strengthening the structure and enhancing the hardenability.

The element Mn is necessary for improving the hardenability and obtaining the desired structure. The improvement in hardenability also contributes to the increase of strength and to the enhancement of mechanical properties by stabilizing the $\gamma$-phase during the $\gamma$-$\alpha$ transformation ($\gamma$=austenite, $\alpha$=ferrite) after the hot-rolling. In order to secure these effects, its content should be 0.3% or more. However, with a Mn content in excess of 2.5%, it causes a welding difficulty and impairs the ductility (elongation and stretch flangeability) and the weldability in addition to a substantial increase of the cost of the steel plate. Therefore, the upper limit should be placed at 2.5%.

The element Si which is necessary for deoxidation of the molten steel is also very effective as a substitutional solid solution hardening element. Therefore, it is essential in order to obtain a steel plate with high strength and ductility. Besides, it acts advantageously to the formation of clean polygonal ferrite. In the composite steel structure as of the present invention, it accelerates the $\alpha$-transformation during the $\gamma$-$\alpha$ transformation after hot rolling and acts to discharge the carbon in solid solution out of $\alpha$-phase and shift into $\gamma$-phase. Consequently, it enhances the cleanliness of $\alpha$-phase and stabilizes $\gamma$-phase by condensing carbon thereinto, thus facilitating the formation of a hard phase which contributes to the improvement of the mechanical properties. In order to produce these effects while preventing enbrittling of the weld (an increase of transition temperature), the lower limit of the Si content should be placed at 0.01%. On the other hand, its upper limit should be placed at 1.8% to prevent deteriorations of surface condition due to production of oxidation scales.

According to the present invention, the following elements may be included if desired in addition to the above-mentioned elements.

The elements Cr, Cu, Ni and B are useful for improving the hardenability as well as for obtaining a desired structure. The lower limits of their contents should be placed at a level which is sufficient enough for securing these effects, while the upper limits should be placed at a level where their effects are saturated and uneconomical. More specifically, the steel plate according to the present invention may contain at least one element selected from the group consisting of 0.1-1.5% of Cr, 0.1-0.6% of Cu, 0.1-1.0% of Ni and 0.0005-0.01% of B. Further, the element Mo which also serves to improve the hardenability and produce a desired structure similarly to the above-mentioned Cr, Cu, Ni and B may also be included in an amount of 0.01-0.2% for the same reasons.

The elements Nb, V, Ti and Zr which serve to strengthen the precipitation are necessary not only for increasing the strength but also for facilitating the formation of the bainite structure by imposing an influence on the transforming structure under coexistence with Mn or the like after hot-rolling. Further, they make the structure finer and serves to improve the stretch flangeability and to prevent drops in hardness, improving not only the fatigue strength of the parent plate but also the fatigue strength of the disc as a whole. Moreover, they contribute to produce the hardenability-improving effect of B to a maximum degree. In order to have these effects, it is necessary to include at least one element selected from the group consisting of 0.01-0.1% of Nb, 0.02-0.2% of V, 0.01-0.1% of Ti and 0.02-0.2% of Zr.

In addition, the component Nb particularly has an influence on the transforming behaviors after the hot-rolling and is most effective for the formation of the bainite structure. The elements Ti and Zr are further effective for controlling the shape of the sulfide which is harmful to the ductility, and the element V is effective for moderately hardening the center portion of the weld ($Hv \approx 25$) as compared with that of the parent material.

The rare earth metals (REM), Ca and Mg contribute to the improvement of the ductility, particularly, the stretch flangeability by controlling the shape of the sulfide. The lower limits on their contents should be placed at a level which is sufficient for producing that effect. The lower limit is determined at a value at which the aimed effect becomes saturated or uneconomical or in consideration of the content which inversely impairs the cleanliness. More specifically, the steel plate of the invention may include at least one element selected from the group consisting of 0.005–0.1% of a REM, 0.0005–0.01% of Ca and 0.0005–0.01% of Mg. However, it is desired that the total additive amount is not more than about 0.1% since an excessive additive amount is rather harmful to the cleanliness and lowers the ductility.

Furthermore, Al is added in an amount of 0.005–0.6% to serves as a deoxidizer at the melting stage. If desired, P may be added in a range which would not cause enbrittling at the grain boundary. Similarly to Si, the element P is a strong hardening component and has an effect of purifying the ferrite, contributing to the improvement of elongation or other properties. In order to have these effects, it should be added in an amount of 0.03–0.1%.

The element S may be contained in a range which is normally permitted for an impurity element, namely, in a range less than 0.02%. An S-content less than 0.02% can produce the effect of improving the formability, especially the stretch flangeability, and the ductility of the weld to a satisfactory degree.

Now, the basic concept of the method according to the present invention is explained with reference to FIG. 8.

Figure 8:
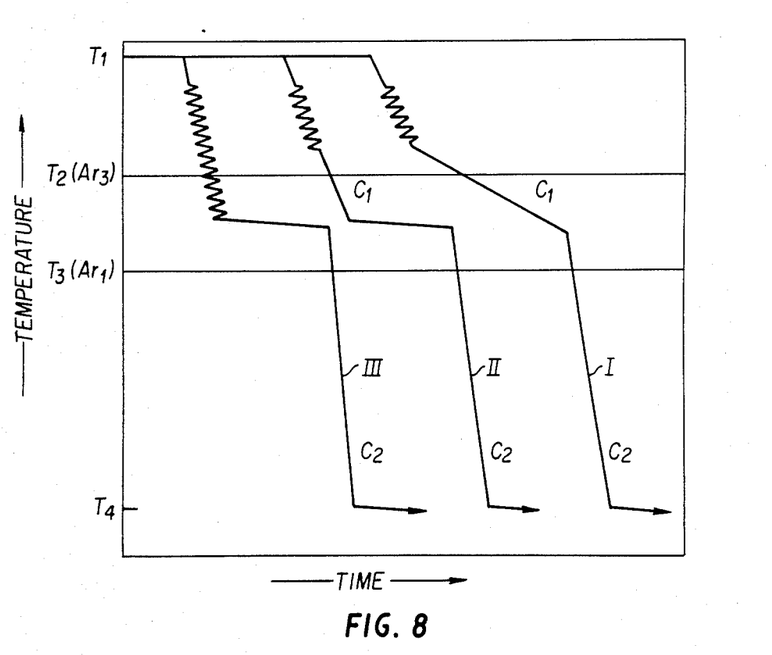
FIG. 8 is a diagram conceptionally showing the method of the present invention.

In FIG. 8, plotted at (I) and (II) is a method according to the invention, in which a steel slab of a predetermined composition is, after heat treatment at $T_1$, subjected to continuous hot rolling, terminating the hot rolling at a temperature higher than the level $T_2$ (corresponding to the point $Ar_3$). The rolled material is then cooled from the finishing rolling temperature to a point between temperature levels $T_2$ and $T_3$ (corresponding to the point $Ar_1$) at a controlled cooling speed $C_1$. Thereafter, in I the material is cooled to $T_4$ (take-up temperature) at the cooling speed $C_2$ and taken up at a temperature below $T_4$. In the case of (II), the material is left for a while for air cooling or slow cooling between the just-mentioned temperature levels $T_2$ and $T_3$ and then immediately cooled off to the temperature level $T_4$ (take-up temperature) at a cooling speed of $C_2$ and taken up at a temperature below the level $T_4$.

In another method which is plotted at (III) of FIG. 8, a steel slab of a predetermined composition is subjected to continuous hot rolling after a heat treatment at the temperature $T_1$, terminating the hot rolling at a point between the temperature levels $T_2$ and $T_3$. Thereafter, the material undergoes the air cooling or slow cooling, cooling (at cooling speed $C_2$) and take-up (at $T_4$) in the same manner as in the above-mentioned method (II).

In the method shown in FIG. 8, the controlled cooling (at $C_1$) to a point between $Ar_3$ and $Ar_1$ in the pattern (I), the controlled cooling (at $C_1$) and the temperature and time of the air or slow cooling in the pattern (II), or the finishing rolling to a point between $Ar_3$ and $Ar_1$ and the temperature or time of the following air or slow cooling in the pattern (III) are important as a preparatory stage for obtaining a desired composite steel structure. The metallurgical mechanisms which are involved in these three manufacturing patterns are as follows.

The cooling stage from the hot rolling finishing temperature to the point in the range from $Ar_3$ to $Ar_1$ in the pattern (I) is a region where mostly the polygonal ferrite phase ($\alpha$) and the austenite phase ($\gamma$) coexist, so that carbon in solid solution of $\alpha$-phase is condensed into $\gamma$-phase by employing relatively slow cooling in that stage, thereby stabilizing the $\gamma$-phase and improving the ductility through purification of the $\alpha$-phase which contains less carbon in solid solution. Therefore, the average cooling speed $C_1$ which is employed for cooling to a temperature range from $Ar_3$ to $Ar_1$ subsequent to the finish rolling at the temperature above the point $Ar_3$ should be 3°–70° C./sec. If the cooling speed $C_1$ exceeds 70° C./sec, it becomes difficult to obtain an amount of the $\alpha$-phase of a desired structure and to control the temperature appropriately. On the contrary, with a cooling speed lower than 3° C./sec, there occurs ferrite transformation or pearlite transmation, inviting a drop in productivity due to the lengthy cooling time. Therefore, the cooling speed $C_1$ is preferred to be in the range of 3°–30° C./sec.

Similarly to Pattern (I), the average cooling speed $C_1$ from the rolling finish temperature to the temperature range of $Ar_3$ to $Ar_1$ in Pattern (II) should be 3°–70° C./sec and is particularly desired to be 20°–70° C./sec for the following reasons. Namely, although the above-mentioned metallurgical mechanisms take place by effecting relatively slow cooling in Pattern (I) in cooling the material from the rolling finish temperature to the level between $Ar_3$ and $Ar_1$, air cooling or slow cooling in Pattern (II) is effected in the temperature range of $Ar_3$ to $Ar_1$ which is in the vicinity of the ferrite transformation nose, in order to obtain the mechanisms as mentioned above.

Since the air cooling or slow cooling is effected in the vicinity of the ferrite transformation nose, a predetermined amount of ferrite can be obtained in a short time period due to the accelerated ferrite transformation, and carbon in solid solution of the ferrite phase which has transformed during the slow cooling is condensed into the austenite phase. As a result, the amount of carbon in solid solution of the ferrite phase is reduced, enhancing the purity and ductility. Namely, as the above-mentioned mechanisms are obtained by the air cooling or slow cooling in the temperature range of $Ar_3$ to $Ar_1$, in Pattern (II), it is desirable to effect the cooling from the hot rolling finish temperature to the temperature range $Ar_3$ to $Ar_1$ at as high a speed as possible, in contrast to Pattern (I). On the other hand, the austenite phase with an increased amount of carbon is stabilized to facilitate the formation of the low temperature transformation products in the subsequent cooling stage. The time period of the air or slow cooling should not be too short in order to obtain the desired amount of ferrite nor too long to avoid the ferrite transformation in the entire steel structure or the pearlite transformation. Further, since it is limited by the length of the run-out table, the time period of the air cooling or slow cooling should be 2–20 seconds.

Now, as shown in Pattern (III), the controlled cooling ($C_1$) is not required when the finish rolling is carried out in the temperature range of $Ar_3$ to $Ar_1$. In this instance, the finish rolling temperature is preferred to be higher than 710° C. Although the air cooling or slow cooling from the finish rolling temperature is effected after termination of the finish rolling in Pattern (III), the metallurgical mechanisms and the time of air cooling or slow cooling are the same as in Pattern (II).

The cooling at $C_2$ subsequent to the cooling of Patterns (I) to (III) is intended for converting the austenite into a hard low-temperature transformation product and should be effected at an average cooling speed ($C_2$) higher than 20° C./sec, preferably in the range of 30°-70° C./sec. With a lower cooling speed $C_2$, the austenite is transformed into pearlite in part or in its entirety. On the contrary, a cooling speed higher than the above-defined range results in a lower strength-ductility balance and a higher yield ratio.

The reason why a hard phase is formed at such a relatively low cooling speed $C_2$ is the enhancement of stability of the austenite which takes place in the meantime, so that the transitional stage from the finishing rolling temperature to the initiation of the $C_2$ cooling is important. Further, the fact that the hard phase is mainly made of the bainite phase permits the cooling at a relatively low speed $C_2$ and contributes to the improvement of the strength-ductility balance.

Thereafter, the steel plate is wound up at a predetermined temperature and this take-up temperature ($T_4$) constitutes another important point of the present invention. More particularly, it is desirable to effect the cooling to room temperature in order to form martensite, which however in turn brings about various defects such as a drop in the strength-ductility balance due to the existence of carbon in solid solution remaining in the course of cooling to the temperature $T_4$ or a rise of the yield ratio, coupled with the above-mentioned shortcomings of the ferrite+martensite steel. Therefore, it is preferred to wind up at a temperature above 300° C. for obtaining the desired structure. The upper limit of the take-up temperature $T_4$ should be place at 550° C. since pearlite transformation takes place at temperatures above 550° C. unless the alloy elements are added in large quantities.

The hot-rolled steel plate which is obtained by the above-described method is of a tripple phase structure consisting of polygonal ferrite, bainite (i.e., the carbide-including bainite and bainitic ferrite) and martensite (partly containing retained austenite) and particularly has bainite phase areas at a ratio of 4-45% and martensite areas at a ratio of 1-15%, the area ratio of the bainite phase being greater than that of the martensite phase. This steel plate is in any of the properties of yield ratio, strength-elongation balance, stretch flangeability and resistance weldability.

The range of the chemical composition of the steel plate which is intended by the method of the invention, the preferred ranges of the area rates of its bainite and martensite phases and the particle size of the martensite are same as defined hereinbefore.

Hereafter, the steel structure and its manufacturing method of the invention are illustrated more particularly by way of a number of examples.

EXAMPLE 1

The materials of the chemical compositions shown in Table 1 were each melted in a vacuum melter, roughly rolled into a 30 mm thick slab and then into a 4 mm thick plate by 3-pass hot rolling.

The materials which were cooled to room temperature by air cooling subsequent to the hot rolling were heated to a temperature in the range of 780°-950° C. for 5-10 minutes and then cooled under different conditions to obtain specimens of different structures.

The results of the microscopic observation and measurement of the resective specimens are shown in Table 2 along with the results of measurement of the mechanical properties. With regard to the results of measurement, the relations of the tensile strength with the yield stress, total elongation and hole expansibility are plotted in FIGS. 1 and 2. As stated hereinbefore, the specimen Nos. 1 to 7 which have a steel structure according to the present invention show excellent properties in the yield ratio, strength-elongation balance and stretch flangeability.

Table 3 shows the properties and the results of fatigue test of the specimens which were same as the specimen No. 6 in the chemical composition of the starting material but formed into different structures by varying the heating and cooling conditions. As seen therefrom, the steel according to the invention shows an excellent property also in the fatigue strength.

TABLE 1

| Specimen No. | Chemical Composition (wt %) | | | | | Conditions of Heat Treatment | | Remarks |
| | C | Si | Mn | S | Other element | Heat retention | Cooling speed | |
| --- | --- | --- | --- | --- | --- | --- | --- | --- |
| 1 | 0.07 | 0.8 | 1.5 | 0.004 | | 950° C. × 5 min. | 40° C./sec. | Invention |
| 2 | 0.06 | 0.8 | 1.3 | 0.005 | Cr 0.8 | 950° C. × 5 min. | 7° C./sec. | |
| 3 | 0.06 | 0.8 | 1.2 | 0.004 | Ni 0.5, Cr 0.5 | 950° C. × 5 min. | 4° C./sec. | |
| 4 | 0.05 | 0.8 | 1.2 | 0.005 | Ti 0.03, B 0.02 | 850° C. × 5 min. | 10° C./sec. | |
| 5 | 0.06 | 0.8 | 1.2 | 0.005 | Nb 0.02, V 0.03, Cr 0.5 | 950° C. × 5 min. | 40° C./sec. | |
| 6 | 0.05 | 0.8 | 1.4 | 0.004 | Cr O.5, REM 0.08 | 950° C. × 5 min. | 8° C./sec. | |
| 7 | 0.06 | 0.8 | 1.3 | 0.004 | Cr 0.5, Al 0.02 | 950° C. × 5 min. | 10° C./sec. | |
| 8 | 0.07 | 0.8 | 1.5 | 0.004 | Cr 0.7, Cu 0.1 | 790° C. × 5 min. | 10° C./sec. | Comparative Examples |
| 9 | 0.07 | 0.8 | 1.5 | | Cr 0.7, Cu 0.1 | 950° C. × 5 min. | 10° C./sec. | |
| 10 | 0.07 | 0.2 | 0.5 | 0.005 | | 950° C. × 5 min. | 60° C./sec. | |
| 11 | 0.3 | 0.8 | 1.5 | 0.005 | | 950° C. × 5 min. | 60° C./sec. | |
| 12 | 0.07 | 0.8 | 1.3 | 0.03 | Cr 0.8 | 950° C. × 5 min. | 7° C./sec. | |
| 13 | 0.06 | 0.8 | 1.5 | 0.005 | Cr 0.5 | 950° C. × 5 min. | 100° C./sec. | |
| 14 | 0.07 | 0.8 | 1.5 | 0.005 | Cr 0.8 | 780° C. × 10 min. | 20° C./sec. | |
| 15 | 0.10 | 0.4 | 1.5 | 0.004 | Cr 0.8 | 780° C. × 10 min. | 10° C./sec. | |
| 16 | 0.04 | 0.10 | 1.4 | 0.004 | Cr 0.9, Al 0.02 | 780° C. × 10 min. | 10° C./sec. | |
| 17 | 0.06 | 0.6 | 1.5 | 0.004 | Cr 0.8, Al 0.03 | 950° C. × 10 min. | 20° C./sec. | |
| 18 | 0.05 | 0.20 | 1.5 | 0.005 | Cr 0.9 | 950° C. × 10 min. | 20° C./sec. | |
| 19 | 0.06 | 1.1 | 1.5 | 0.005 | Cr 1.5, Al 0.02 | 950° C. × 10 min. | 20° C./sec. | |

TABLE 2

| Specimen No. | Y.S. (kg/mm$^2$) | T.S. (kg/mm$^2$) | El. (%) | E.P.E. (%) | Y.R. | H.E. (%) | P.F. (%) | M. (%) | B. (%) | Remarks |
|---|---|---|---|---|---|---|---|---|---|---|
| 1 | 35.4 | 57.2 | 29.7 | 0 | 0.62 | 155 | 68 | 7 | 25 | Invention |
| 2 | 31.0 | 59.5 | 28.2 | 0 | 0.52 | 150 | 52 | 8 | 40 | |
| 3 | 28.1 | 52.1 | 33.6 | 0 | 0.55 | 155 | 80 | 5 | 15 | |
| 4 | 33.8 | 58.2 | 28.5 | 0 | 0.58 | 155 | 65 | 5 | 30 | |
| 5 | 31.5 | 58.3 | 28.7 | 0 | 0.54 | 160 | 77 | 8 | 15 | |
| 6 | 27.2 | 54.5 | 33.1 | 0 | 0.50 | 160 | 73 | 7 | 20 | |
| 7 | 28.6 | 55.0 | 32.6 | 0 | 0.52 | 155 | 70 | 7 | 23 | |
| 8 | 30.0 | 64.0 | 26.5 | 0 | 0.47 | 140 | 80 | 13 | 7 | Comparative Examples |
| 9 | 41.8 | 67.5 | 24.5 | 0 | 0.62 | 145 | 35 | 8 | 57 | |
| 10 | 21.2 | 32.7 | 48.9 | 3.5 | 0.65 | 160 | 97 | | (*) | |
| 11 | 91.0 | 100.9 | 11.5 | 0 | 0.90 | 40 | 0 | 100 | 0 | |
| 12 | 31.3 | 59.1 | 23.4 | 0 | 0.53 | 50 | 55 | 9 | 36 | |
| 13 | 54.1 | 72.1 | 20.4 | 0 | 0.75 | 125 | 0 | 5 | 95 | |
| 14 | 31.2 | 65.1 | 27.6 | 0 | 0.48 | 120 | 82 | 23 | 0 | |
| 15 | 39.3 | 85.7 | 19.5 | 0 | 0.46 | 115 | 56 | 44 | 0 | |
| 16 | 29.8 | 57.7 | 32.5 | 0 | 0.52 | 135 | 73 | 27 | 0 | |
| 17 | 45.2 | 70.0 | 21.0 | 0 | 0.65 | 140 | 40 | 0 | 60 | |
| 18 | 42.0 | 61.4 | 25.1 | 0 | 0.68 | 150 | 20 | 0 | 80 | |
| 19 | 54.8 | 85.8 | 16.5 | 0 | 0.64 | 130 | 15 | 0 | 85 | |

Y.S.: Yield strength;
T.S.: Tensile strength;
El.: Elongation
E.P.E.: Yield point elongation
Y.R.: Yield rate
H.E.: Hole expansibility
P.F.: Polygonal ferrite
M.: Martensite (partly including retained austenite)
B.: Bainite
(*) Pearlite 3%

TABLE 3

| Specimen No. | Microscopic Structure | | | Tensile Properties | | | | Fatigue Strength (endurance limit) | | | | Remarks |
| | P.F. (%) | M.* (%) | B. (%) | Y.S. (kg/mm$^2$) | T.S. (kg/mm$^2$) | El. (%) | Y.R. | A* | B* | C* | D* | |
|---|---|---|---|---|---|---|---|---|---|---|---|---|
| 6-1 | 85 | 15 | 0 | 33.9 | 65.3 | 27.6 | 0.52 | 32.4 | 26.3 | 31.4 | 26.5 | Comparative Example |
| 6-2 | 72 | 8 | 20 | 35.1 | 63.8 | 28.2 | 0.55 | 42.2 | 32.5 | 35.5 | 31.3 | Invention |
| 6-3 | 0 | 5 | 95 | 57.6 | 67.0 | 21.0 | 0.86 | 43.0 | 33.6 | 35.7 | 32.0 | Comparative Example |

*Partly including retained austenite
A*: Base Material
B*: Base material + 5 mm hole
C*: 9% tensile deformation
D*: 9% deformation + 5 mm hole Nextly, a steel plate was produced from a specimen which was obtained by adding 0.1% of Ce to Specimen No. 2, hot-rolling, cooling and taking up the specimen under the conditions under the conditions shown in Table 4. The thus obtained steel plate was subjected to a wheel disc forming test of actual scale (n=20). Table 5 below shows the results of the microscopic observation and measurement, along with the results of measurement of mechanical properties and the rate of defective wheel discs in forming operation. As seen therefrom, the steel according to the present invention is extremely low in the rate of defective wheel discs.

TABLE 4

| Specimen No. | Finishing Rolling Temperature | Cooling Condition | Take-up Temperature | Remarks |
|---|---|---|---|---|
| 2-1 | 830° C. | 20° C./sec. → 620° C. → 60° C./sec. | 250° C. | Comparative Example |
| 2-2 | 830° C. | 20° C./sec. → 570° C. → 60° C./sec. | 250° C. | Invention (Pattern Ⓘ) |
| 2-3 | 830° C. | 20° C./sec. → 600° C. → 60° C./sec. | 450° C. | Invention (Pattern Ⓘ) |
| 2-4 | 830° C. | 50° C./sec. | 500° C. | Comparative Example |

TABLE 5

| Specimen No. | Microscopic structure (%) | | | Mechanical Properties (blank) | | | | | Rate of defective Wheel Discs (%) |
| | P.F. | M.* | B. | Y.S. (kg/mm$^2$) | T.S. (kg/mm$^2$) | El. (%) | Y.R. | H.E. (%) | |
|---|---|---|---|---|---|---|---|---|---|
| 2-1 | 77 | 23 | 0 | 35.9 | 67.8 | 27.4 | 0.53 | 60 | 30 |
| 2-2 | 68 | 8 | 24 | 33.0 | 57.9 | 26.9 | 0.57 | 160 | 0 |

TABLE 5-continued

| Specimen No. | Microscopic structure (%) | | | Mechanical Properties (blank) | | | | | Rate of defective Wheel Discs (%) |
|---|---|---|---|---|---|---|---|---|---|
| | P.F. | M.* | B. | Y.S. (kg/mm²) | T.S. (kg/mm²) | El. (%) | Y.R. | H.E. (%) | |
| 2-3 | 60 | 6 | 34 | 31.3 | 60.1 | 26.0 | 0.52 | 160 | 0 |
| 2-4 | 20 | 12 | 68 | 42.5 | 65.4 | 18.6 | 0.65 | 90 | 5 |

*Partly containing retained austenite.

EXAMPLE 2

The materials of the chemical compositions shown in Table 6 were each melted in a vacuum melter, roughly rolled into a 30 mm thick slab and then into a 4 mm thick plate by 3-pass hot rolling.

The materials which were cooled to room temperature by air cooling were heated at the temperatures shown in Table 7 for 5 minutes and then cooled under different conditions to obtain specimens of different structures.

The results of microscopic observation and measurement of the thus obtained specimens are shown in Tables 7 and 8, along with the results of measurement of mechanical properties. As mentioned hereinbefore, the steel specimens 20 to 22 according to the present invention were invariably low in the yield ratio and excellent in strength-elongation balance and stretch flangeability.

In this Example, it is particularly to be noted that the components which play a main role in the steel structure of the invention are Si and Mn. Namely, in a case where the Si and Mn components are in the above-defined ranges and the ratio of Si/Mn is greater than 1, the yield ratio, strength-elongation balance and hole expansibility of the tripple phase steel structure of the invention are improved to a considerable degree. The reasons for this phenomenon is not known at the present stage but are considered as follows.

(1) The amount and length of the sulfide inclusions are increased by the addition Si. In view of the large content of Mn, the ratio of Si/Mn is desired to be greater than 1.0.

(2) The component Si has a higher hardening effect than Mn and lowers the stacking fault energy, delaying the formation of cells. As a result, the cell size becomes finer to permit higher elongation and reduction.

(3) The component Si accelerates the condensation of C from ferrite to γ-phase, thereby purifying the ferrite and making a large difference in hardness between the ferrite and the low temperature transformation product to permit a high elongation.

TABLE 6

| Specimen No. | Chemical Compositions (%) | | | | |
|---|---|---|---|---|---|
| | C | Si | Mn | S | Other elements |
| 20 | 0.06 | 1.3 | 1.1 | 0.007 | |
| 21 | 0.06 | 1.3 | 1.0 | 0.006 | Nb 0.02, V 0.03, Cr 0.6 |
| 22 | 0.07 | 1.3 | 1.0 | 0.004 | Cr 0.85 REM 0.08 |

TABLE 7

| Specimen No. | Heat Treatment Conditions | | Microscopic Structure | | | Remarks |
|---|---|---|---|---|---|---|
| | Heat retention | Cooling speed | P.F. (%) | M.* (%) | B. (%) | |
| 20 | 880° C. × 5 min. | 20° C./sec | 70 | 5 | 25 | Invention |
| 21 | 950° C. × 5 min. | 60° C./sec | 70 | 8 | 22 | |
| 22 | " | 10° C./sec | 60 | 7 | 33 | |

*partly including retained austenite

TABLE 8

| Specimen No. | Y.S. (kg/mm²) | T.S. (kg/mm²) | El. (%) | E.P.El. (%) | Y.R. | H.E. (%) | Remarks |
|---|---|---|---|---|---|---|---|
| 20 | 33.1 | 60.3 | 32.0 | 0 | 0.55 | 160 | Invention |
| 21 | 33.9 | 61.7 | 30.5 | 0 | 0.55 | ≧160 | |
| 22 | 32.1 | 61.9 | 32.1 | 0 | 0.52 | ≧160 | |

Y.S.: yield strength
T.S.: tensile strength
El: elongation
Y.P.El.: yield point elongation
Y.R.: yield ratio
H.E.: hole expanding limit

EXAMPLE 3

The materials of the chemical compositions shown in Table 9 were each melted in a vacuum melter and roughly rolled into a 30 mm thick slab and then into a 3.4 mm thick steel plate by 3-pass hot rolling.

Further, the materials which were cooled to room temperature by air cooling were quickly heated to 950° C. and, after retaining that temperature for several minutes, they were cooled under different conditions to obtain specimens of desired structures.

The conditions of the heat treatment and the results of the measurement of the microscopic structures are shown in Table 10.

TABLE 9

| Specimen No. | Chemical Compositions | | | | | Remarks |
|---|---|---|---|---|---|---|
| | C | Si | Mn | S | Other elements | |
| 23 | 0.05 | 0.4 | 1.5 | 0.005 | Cr 0.8 | Invention |
| 24 | 0.04 | 0.5 | 1.6 | 0.003 | Cr 0.5 Ce 0.003 Nb 0.02 | |

TABLE 10

| Specimens No. | Conditions of Heat Treatment & Structures | | | Remarks |
|---|---|---|---|---|
| | Heat Treatment Conditions | | Structure (area ratio) | |
| | Heat retention | Cooling speed | | |
| 23 | 950° C. × 8 min | 7° C./sec | 44% B- 9% M-F | Invention |
| 24 | 950° C. × 8 min | 40° C./sec | 24% B- 8% M-F | |

B: Bainite
F: Polygonal ferrite
M: Martensite (partly including retained austenite)

A material containing 0.04% of Ce in addition to the composition of the specimen No. 23 and a material of the same composition as the specimen No. 24 were prepared by melting the materials on the spot, followed by blooming and hot rolling, and cooled and wound up under the conditions shown in Table 11. The resulting steel plate specimens were formed into ordinary wheel rims of an actual size by flush-butt welding and rolling forming. The microscopic structures, mechanical properties and wheel rim formability of the respective steel plates are shown in Table 12.

| Welding Conditions: | |
|---|---|
| Flash margin: | 3 mm |
| Flash time: | 3 seconds |
| Upset margin: | 3 mm |
| Upset time: | 2/60 seconds |
| Upset speed: | 150 mm/sec |
| Blank size: | 30 mm(w) × 75 mm(l) × 3.2 mm(t) |

TABLE 11

| Specimen No. | Chemical Composition | Manufacturing Conditions | | Take-up temperature | Remarks |
|---|---|---|---|---|---|
| | | Finishing rolling temperature | Cooling condition | | |
| I | 0.04% of Ce added to No. 23 of Table 9 | 840° C. | 20° C./s-620° C.-60° C./s | 250° C. | Comparative Example |
| II | 0.04% of Ce added to No. 23 of Table 9 | 840° C. | 20° C./s-600° C.-60° C./s | 450° C. | Invention (Pattern ①) |
| III | Same as No. 24 of Table 9 | 830° C. | 5° C./s-750° C.-60° C./s | 450° C. | Invention (Pattern ①) |

TABLE 12

| | Structures & Mechanical Properties | | | | | |
|---|---|---|---|---|---|---|
| Specimen No. | Microscopic Structure | Mechanical Properties of Blank | | | | Rate of defective wheel rims (%) | Remarks |
| | | Y.S. (kg/mm$^2$) | T.S. (kg/mm$^2$) | El. (%) | H.E. (%) | | |
| I | 22% M-F | 34.8 | 65.3 | 27.2 | 65 | 60.0 | Comparative Example |
| II | 28% B-6% M-F | 31.7 | 56.8 | 28.8 | 160 | 2.5 | Invention |
| III | 22% B-5% M-F | 33.2 | 58.9 | 28.2 | 160 | 0.5 | Invention |

Y.S.: yield strength
T.S.: tensile strength
El.: elongation
H.E.: hole expanding limit Further, the results of examination of the hardness distribution after flush-butt welding of these hot-rolled steel plates are shown in FIG. 7. It will be seen therefrom that the softening occurs in a considerable degree in the heat affected zone of the F+M steel structure (Specimen No. I) owing to the decomposition of the second phase martensite.

On the other hand, in the F+B+M steel structure according to the present invention (Specimen Nos. II and III), the softening is leassened conspicuously and, in the presence of NbC, a slight degree of hardening is observed in the heat affected zone instead of softening. Consequently, there is no possibility of the breakage initiating from the heat affected zone in the roll-forming stage of the F+B+M steel structure subsequent to the flash-butt welding. This can be confirmed by reference to Table 2 which shows the rate of defective wheel rims.

EXAMPLE 4

Slabs of 30 mm in thickness were obtained by melting in a high frequency vacuum melter the steel materials of different compositions as shown in Table 13, followed by forgeing and rough rolling. After heating to 1200° C., the slabs were finished into 3.2 mm thick steel plates by 3-pass hot rolling employing a variety of temperatures above the point $Ar_1$ and then taken up at different temperatures below 600° C. Table 14 shows the conditions of hot rolling of these steel plates along with the results of the observation of microscopic structures. In Table 15, there are shown the mechanical properties of the steel plates of Table 14 and the values of tenacity and variations in hardness after flash-butt welding under the following conditions.

In Table 15, "Y.P./T.S." (yield ratio) is used as an index for judging the formability and a lower value means a higher shape fixability or workability. On the other hand, "YPE" (yield point elongation) indicates the presence or absence of wrinkles in those portions which are subjected to tensile stress by working, and the value of the yield point elongation should be as small as possible in order to prevent the wrinkling.

The term "TSXEl" (strength-elongation balance) indicates the balance between the strength and ductility, and a higher value of TSXEl means a better balance. The hole expansibility (λ) is an index of the stretch flangeability and a higher value reflects a better stretch flangeability.

With regard to the flash butt welding, the term "vEs" (upper shelf energy) and "vTrs" (charpy V-notch transition temperature) are indexes of the weld tenacity, which is better when higher in the value of vEs and lower in the value of vTrs. The symbolic expression "ΔHv" indicates the hardness of the weld bounding portion-the hardness of the parent material, and "ΔHv" the hardness of the welding heat affected zone-the hardness of the parent material. The value of "ΔHv" should not be too high since otherwise cracking occurs during the roll-forming operation due to a drop in ductility. On the other hand, a disjoint takes place if the value of "ΔHv" is low As seen from Table 15, the steel plates produced by the method of the present invention are low in the yield ratio with no yield point elongation and have good strength-elongation balance. Besides, the are excellent in the stretch flangeability as well as in the tenacity of the weld, showing a smaller increase of the hardness of the weld bounding portion and a smaller drop in the hardness of the weld heat affected zone, thus as a whole exhibiting excellent resistance weldability.

TABLE 13

| Kinds of steel | Chemical Composition (wt %) | | | | | | | |
|---|---|---|---|---|---|---|---|---|
| | C | Si | Mn | P | S | Cr | Al | Others |
| A | 0.055 | <0.05 | 1.54 | 0.011 | 0.007 | 1.03 | 0.031 | Ce 0.02 |
| B | 0.065 | 0.53 | 1.83 | 0.015 | 0.006 | <0.02 | 0.039 | Ce 0.02 |
| C | 0.051 | 0.51 | 1.48 | 0.006 | 0.004 | 0.53 | 0.030 | Ce 0.02 |
| D | 0.075 | 0.48 | 1.45 | 0.005 | 0.010 | 1.10 | 0.034 | Ce 0.02 |
| E | 0.045 | 0.40 | 1.51 | 0.014 | 0.005 | 0.43 | 0.029 | Nb 0.029, Ce 0.02 |
| F | 0.070 | 1.05 | 0.92 | 0.015 | 0.004 | 1.30 | 0.033 | Ce 0.02 |

TABLE 14

| Specimen No. | Kind of steel | Hot rolling conditions | | | | Microscopic structure (%) | Remarks |
|---|---|---|---|---|---|---|---|
| | | Finishing Temp. ($T_2$) (°C.) | Cooling speed (°C./sec) | Air cooling temp. ($T_3$)·time | Take-up temp. ($T_4$) (°C.) | | |
| 25 | A | 850 | 30 | — | 620 | F + P | Comparative |
| 26 | B | 850 | 30 | — | " | " | Example |
| 27 | C | 850 | 30 | — | " | " | |
| 28 | C | 740 | 30 | — | " | " | |
| 29 | D | 850 | 30 | — | " | " | |
| 30 | E | 850 | 5 | — | " | " | |
| 31 | A | 850 | 30*–60** | 760° C. × 15s | 350 | F + 21B + 2M | Invention |
| 32 | B | 840 | 30*–60** | 740° C. × 10s | 300 | F + 12B + 2M | Pattern (II) |
| 33 | C | 850 | 30*–60** | 770° C. × 10s | 300 | F + 18B + 2M | |
| 34 | D | 860 | 30*–40** | 730° C. × 15s | 450 | F + 33B + 5M | |
| 35 | E | 830 | 30*–60** | 760° C. × 10s | 350 | F + 27B + 3M | |
| 36 | F | 730 | 50** | 730° C. × 12s | 250 | F + 32B + 11M | Invention |
| 37 | F | 730 | 50** | " | 300 | F + 32B + 8M | Pattern (III) |
| 38 | F | 730 | 50** | " | 350 | F + 30B + 5M | |
| 39 | F | 730 | 50** | " | 450 | F + 38B + 3M | |
| 40 | F | 730 | 50** | " | 550 | F + 39B + 2M | |
| 41 | C | 740 | 50** | " | Room Temp. | F + 10M | Comparative Example |

F: Polygonal ferrite
B: Bainite
P: Pearlite
M: Martensite (partly including retained austenite)
*Primary cooling speed ($C_1$)
**Secondary cooling speed ($C_2$)

TABLE 15

| Specimen No. | Mechanical Properties | | | | | | | Welded Portion | | | | Remarks |
|---|---|---|---|---|---|---|---|---|---|---|---|---|
| | Blank | | | | | | | | | | | |
| | Y.S. (kg/mm²) | T.S. (kg/mm²) | El. (%) | YPE (%) | YP/TS | TS × El | λ (%) | vEs (kg-M) | vTrs (°C.) | ΔHv₁* | ΔHv₂* | |
| 25 | 30.6 | 40.2 | 38.0 | 2.7 | 0.76 | 1528 | | | | | | Comparative |
| 26 | 34.2 | 45.1 | 33.8 | 3.4 | 0.76 | 1524 | | | | | | Example |
| 27 | 37.2 | 48.5 | 30.9 | 2.1 | 0.77 | 1499 | | | | | | |
| 28 | 38.3 | 50.0 | 28.6 | 1.8 | 0.77 | 1430 | | | | | | |
| 29 | 40.5 | 53.2 | 23.9 | 1.7 | 0.76 | 1271 | | | | | | |
| 30 | 48.4 | 59.5 | 26.0 | 1.7 | 0.81 | 1547 | | | | | | |
| 31 | 29.2 | 58.4 | 27.2 | 0 | 0.50 | 1588 | 155 | 2.93 | −55 | +20 | −1 | Invention |
| 32 | 33.0 | 54.1 | 28.3 | 0 | 0.61 | 1531 | 160 | 2.95 | −55 | +25 | −2 | |
| 33 | 33.0 | 53.2 | 28.4 | 0 | 0.62 | 1510 | 155 | 2.89 | −60 | +20 | −3 | |
| 34 | 29.1 | 59.5 | 28.6 | 0 | 0.49 | 1702 | 155 | 2.92 | −55 | +15 | −2 | |
| 35 | 34.9 | 59.2 | 27.4 | 0 | 0.59 | 1622 | 155 | 2.87 | −65 | +20 | +10 | |
| 36 | 47.5 | 70.9 | 21.7 | 0 | 0.67 | 1539 | 155 | 3.04 | −50 | +10 | −10 | |
| 37 | 37.5 | 65.8 | 24.7 | 0 | 0.57 | 1625 | ≧160 | 2.81 | −50 | +15 | −5 | |
| 38 | 34.2 | 63.4 | 28.2 | 0 | 0.54 | 1788 | ≧160 | 2.83 | −55 | +15 | 0 | |
| 39 | 34.5 | 66.3 | 26.3 | 0 | 0.52 | 1744 | ≧160 | 2.83 | −55 | +15 | 0 | |
| 40 | 32.6 | 61.5 | 28.3 | 0 | 0.53 | 1740 | ≧160 | 2.86 | −55 | +20 | 0 | |
| 41 | 32.8 | 53.7 | 29.6 | 0 | 0.61 | 1590 | 120 | 2.75 | −50 | +30 | −30 | Comparative Example |

*Vicker's hardness
Y.S.: yield strength
T.S.: tensile strength
El.: elongation
YPE: yield point elongation
YP/TS: yield ratio
TS × El: tensile strength × elongation
λ: hole expanding limit

EXAMPLE 5

The steel material of the composition shown in Table 16 was melted in a high frequency vacuum melter and hot-rolled in the same manner as in Example 4, varying the cooling speed and the take-up temperature to obtain intended steel structures. Table 17 below shows the conditions of the hot rolling and the results of the observation of microscopic structures of the hot rolled steel plates, while Table 18 shows their mechanical structures.

TABLE 16

| Kind of Steel | Chemical Composition (wt %) | | | | | | | |
|---|---|---|---|---|---|---|---|---|
| | C | Si | Mn | P | S | Cr | Al | Others |
| G | 0.10 | 0.2 | 1.3 | 0.008 | 0.005 | 0.7 | 0.025 | Ce 0.007 |

TABLE 17

Conditions of Hot Rolling & Structures

| Specimen No. | Hot Rolling Conditions | | | | Microscopic structures (%) | | | Remarks |
|---|---|---|---|---|---|---|---|---|
| | Finishing Temp. (°C.) | Cooling speed (°C./sec) | Air cooling temp. (°C.) | Take-up temp. (°C.) | F | B | M | |
| 42 | 840 | 60 | — | 350 | 15.8 | 81.9 | 2.3 | Comparative |
| 43 | 840 | 60 | — | 400 | 34.0 | 62.9 | 3.1 | Example |
| 44 | 830 | 60 | — | 450 | 45.8 | 49.9 | 4.3 | |
| 45 | 830 | 5*–40** | 810 | 350 | 61.3 | 33.8 | 4.9 | Inven- |
| 46 | 840 | 5*–30** | 810 | 350 | 74.5 | 19.8 | 5.7 | tion |
| 47 | 820 | 4*–30** | 800 | 350 | 80.9 | 15.3 | 3.8 | Pattern |
| 48 | 850 | 20*–40** | 730 | 350 | 58.0 | 39.8 | 2.2 | I |
| 49 | 840 | 5*–150** | 700 | 350 | 85.2 | 4.1 | 10.7 | Compara- |
| 50 | 840 | 10*–150** | 600 | 350 | 85.8 | 2.3 | 11.8 | tive Example |
| 51 | 840 | 5*–30** | 800 | 450 | 85.5 | 11.5 | 3.0 | Inven- |
| 52 | 840 | 5*–30** | 800 | 400 | 88.0 | 7.8 | 4.2 | tion |
| 53 | 800 | 4*–60** | 700 | 450 | 80.2 | 17.5 | 2.3 | Pattern |
| 54 | 840 | 5*–80** | 730 | 350 | 71.5 | 15.7 | 12.8 | I |
| 55 | 840 | 5*–150** | 780 | 350 | 66.4 | 16.3 | 17.3 | Compara- |
| 56 | 840 | 4*–150** | 800 | 300 | 54.5 | 13.6 | 31.9 | tive |
| 57 | 840 | 60 | — | 600 | Ferrite + Pearlite | | | Example |

F: Polygonal ferrite
B: Bainite
M: Martensite (partly including retained austenite)
*Primary cooling speed ($C_1$)
**Secondary cooling speed ($C_2$)

TABLE 18

| Specimen No. | Mechanical Properties | | | | | | Remarks |
|---|---|---|---|---|---|---|---|
| | Y.S. (kg/mm²) | T.S. (kg/mm²) | El. (%) | YP/TS | TS × El | λ (%) | |
| 42 | 65.5 | 87.4 | 10.5 | 0.75 | 918 | 127 | Compara- |
| 43 | 57.1 | 78.2 | 11.2 | 0.73 | 875 | 139 | tive |
| 44 | 48.4 | 71.2 | 18.0 | 0.68 | 1281 | 143 | Example |
| 45 | 40.1 | 64.7 | 24.7 | 0.62 | 1598 | 164 | Invention |
| 46 | 32.3 | 59.8 | 32.0 | 0.54 | 1914 | 172 | |
| 47 | 32.3 | 59.9 | 31.9 | 0.54 | 1911 | 175 | |
| 48 | 46.2 | 68.9 | 21.2 | 0.67 | 1461 | 151 | |
| 49 | 35.7 | 63.7 | 24.3 | 0.56 | 1548 | 145 | Compara- |
| 50 | 33.4 | 61.8 | 29.8 | 0.54 | 1842 | 140 | tive Example |
| 51 | 30.1 | 56.9 | 32.7 | 0.53 | 1861 | 182 | Invention |
| 52 | 29.0 | 54.8 | 32.9 | 0.53 | 1803 | 172 | |
| 53 | 32.0 | 60.3 | 31.5 | 0.53 | 1899 | 175 | |
| 54 | 36.3 | 62.6 | 28.7 | 0.58 | 1796 | 156 | |
| 55 | 40.1 | 65.8 | 25.8 | 0.61 | 1698 | 144 | Compara- |
| 56 | 46.3 | 71.3 | 18.2 | 0.65 | 1298 | 120 | tive |
| 57 | 31.8 | 43.5 | 33.3 | 0.73 | 1449 | 155 | Example |

Y.S.: yield strength
T.S.: tensile strength
El.: elongation
YP/TS: yield ratio
TS × El: tensile strength × elongation
λ: hole expanding limit It will be also obvious from the foregoing results that the steel plates produced by the method of the present invention are low in the yield ratio and conspicuously improved in strength-elongation balance as well as in stretch flangeability.

EXAMPLE 6

The steel specimens of the compositions shown in Table 19 were prepared, employing the conditions of heat treatments shown also in Table 19. The microscopic structures and mechanical properties of the resulting steel plates shown in Table 20. As clear therefrom, the steel plates produced by the method of the invention all show a 150% or higher hole expanding limit.

TABLE 19

Chemical Compositions & Conditions of Heat Treatments

| Specimen No. | Chemical Composition (wt %) | | | | | Heat Treatment Conditions | | Remarks |
|---|---|---|---|---|---|---|---|---|
| | C | Si | Mn | S | Others | Heat retention | Cooling speed | |
| 58 | 0.06 | 0.4 | 1.5 | 0.004 | Cr: 0.8 | 950° C. × 5 min | 5° C./sec | Invention |
| 59 | 0.06 | 0.8 | 1.5 | 0.004 | Cr: 0.8 | " | " | tion |
| 60 | 0.04 | 0.8 | 1.0 | 0.005 | Ni: 0.4, Cr: 0.4 | " | " | |
| 61 | 0.06 | 0.8 | 1.5 | 0.004 | Cr: 0.5, REM: 0.08 | " | 6° C./sec | |

TABLE 19-continued

Chemical Compositions & Conditions of Heat Treatments

| Specimen No. | Chemical Composition (wt %) | | | | | Heat Treatment Conditions | | Remarks |
|---|---|---|---|---|---|---|---|---|
| | C | Si | Mn | S | Others | Heat retention | Cooling speed | |
| 62 | 0.07 | 0.8 | 1.3 | 0.004 | Cr: 0.4, Al: 0.03 | " | 10° C./sec | |
| 63 | 0.05 | 0.8 | 1.5 | 0.004 | Cr: 0.7, Cu: 0.1 | 800° C. × 5 min | 10° C./sec | |
| 64 | 0.07 | 0.8 | 1.5 | 0.004 | Cr: 0.8, | 780° C. × 10 min | 20° C./sec | Comparative Example |

TABLE 20

Microscopic Structures & Mechanical Properties

| Speci- men No. | Microscopic structure | | | | Mechanical properties | | | | | Remarks |
|---|---|---|---|---|---|---|---|---|---|---|
| | F | B | M | M.P.S* | Y.S. (kg/mm$^2$) | T.S. (kg/mm$^2$) | El. (%) | Y.S./T.S. | λ (%) | |
| 58 | 58 | 35 | 7 | 5 | 36.7 | 56.5 | 29.5 | 0.65 | 155 | Invention |
| 59 | 65 | 30 | 5 | 3.5 | 33.6 | 58.0 | 28.5 | 0.58 | 165 | |
| 60 | 85 | 13 | 3 | 2 | 26.8 | 51.5 | 34.0 | 0.52 | 175 | |
| 61 | 77 | 18 | 5 | 4 | 28.6 | 54.0 | 33.5 | 0.53 | 175 | |
| 62 | 75 | 20 | 5 | 4 | 28.8 | 55.3 | 33.1 | 0.52 | 160 | |
| 63 | 87 | 9 | 4 | 6 | 31.5 | 60.5 | 27.5 | 0.52 | 150 | |
| 64 | 82 | 0 | 23 | 9 | 31.2 | 65.1 | 27.6 | 0.48 | 120 | Comparative Example |

*Martensite particle size (μ)
Y.S.: yield strength
T.S.: tensile strength
El.: elongation
Y.S./T.S.: yield ratio
λ: hole expanding limit

What is claimed is:

1. A high strength steel plate having a low yield ratio below 0.7 and improved strength-elongation balance and stretch flangeability, said steel plate containing 0.01–0.2% of C, 0.3–2.5% of Mn and 0.01–1.8% of Si and having a tripple phase of polygonal ferrite, bainite and martensite, the area ratios of said bainite and martensite phases being 4–45% and 1–15%, respectively, and the area ratio of said bainite phase being greater than that of martensite phase said martensite having an average particle size smaller than 6 microns.

2. A high strength steel plate as set forth in claim 1, wherein the area ratio of said bainite phase is in the range of 6–35%.

3. A high strength steel plate as set forth in claim 1, wherein the area ratio of said martensite phase is in the range of 1–10%.

4. A high strength steel plate as set forth in claim 1, wherein said steel contains at least one member selected from the group consisting of 0.1–1.5% of Cr, 0.1–0.6% of Cu, 0.1–1% of Ni and 0.0005–0.01% of B.

5. A high strength steel plate as set forth in claim 1, wherein said steel contains at least one member selected from the group consisting of 0.01–0.1% of Nb, 0.02–0.2% of V, 0.01–0.1% of Ti and 0.02–0.2% of Zr.

6. A high strength steel plate as set forth in claim 1, wherein said steel contains at least one member selected from the group consisting of 0.005–0.1% of a rare earth metal, 0.0005–0.01% of Ca and 0.0005–0.01% of Mg.

7. A high strength steel plate as set forth in claim 1, wherein said steel contains 0.005–0.06% of Al.

8. A high strength steel plate as set forth in claim 1, wherein said steel contains 0.03–0.1% of P.

9. A high strength steel plate having a low yield ratio below 0.7 and improved strength-elongation balance and stretch flangeability, said steel plate containing 0.01–0.2% of C, 0.3–2.5% of Mn and 0.01–1.8% of Si and having a triple phase of polygonal ferrite, bainite and martensite, the area ratio of said bainite and martensite phases being 4–45% and 1–15%, respectively, and the area ratio of said bainite phase being greater than that of said martensite phase said martensite having an average particle size smaller than 6 microns, said steel plate produced by a method comprising (1) subjecting a steel material containing 0.01–0.2% of C, 0.3–2.5% of Mn and 0.01–1.8% of Si to a hot rolling-cooling treatment comprising
  (i) hot rolling with a finish temperature above point Ar$_3$, followed by cooling from said rolling finish temperature to a temperature range of from Ar$_3$ to Ar$_1$ at an average cooling speed of 3°–70° C./sec,
(2) further cooling the hot-rolled steel plate to a temperature below 550° C. at an average cooling speed higher than 20° C./sec; and
(3) taking up the steel plate.

10. The high strength steel plate as set forth in claim 9, wherein said steel plate is taken up at a temperature of 300°–550° C.

11. The high strength steel plate as set forth in claim 9, wherein said average cooling speed from said hot rolling finish temperature to a temperature in the range of Ar$_3$ to Ar$_1$ in (i) of Step (1) is 3°–30° C./sec.

12. The high strength steel plate as set forth in claim 9, wherein said average cooling speed in Step (2) is 30°–70°/sec.

13. The high strength steel plate as set forth in claim 9, wherein the area ratio of said bainite phase is 6–35%.

14. The high strength steel plate as set forth in claim 9, wherein the area ratio of said martensite phase is in the range of 1–10%.

15. The high strength steel plate as set forth in claim 9, wherein said steel contains at least one member selected from the group consisting of 0.01–1.5% of Cr, 0.1–0.6% of Cu, 0.1–1% of Ni and 0.0005–0.01% of B.

16. The high strength steel plate as set forth in claim 9, wherein said steel contains at least one member selected from the group consisting of 0.01–0.1 of Nb, 0.02–0.2% of V, 0.01–0.1% of Ti and 0.02–0.2 of Zr.

17. The high strength steel plate as set forth in claim 9, wherein said steel contains at least one member selected from 0.001–0.01% of a rare earth metal, 0.0005–0.1% of Ca and 0.0005–0.01% of Mg.

18. The high strength steel plate as set forth in claim 9, wherein said steel contains 0.001–0.065 of Al.

19. The high strength steel plate as set forth in claim 9, wherein said steel contains 0.03–0.1% of P.

20. A high strength steel plate having a low yield ratio below 0.7 and improved strength-elongation balance and stretch-flangeability, said steel plate containing 0.01–0.2% of C, 0.3–2.5% of Mn and 0.01–1.8% of Si and having a triple phase of polygonal ferrite, bainite and martensite, the area ratio of said bainite and martenste phases being 4–45% and 1–15%, respectively, and the area ratio of bainite phase being greater than that of said martensite phase, said martensite having an average particle size smaller than 6 microns, said steel plate produced by a method comprising subjecting a steel material containing 0.01–0.2% of C, 0.3–2.5% of Mn and 0.01–1.8% of Si to a hot rolling-cooling treatment comprising hot rolling with a finish temperature above point $Ar_3$, followed by cooling from said rolling finish temperature to a temperature range of from point $Ar_3$ to $Ar_1$ at an average cooling speed of 3°–70° C./sec and then by air cooling or slow cooling for 2–20 seconds from said temperature range of $Ar_3$ to $Ar_1$, further cooling the hot-rolled steel plate to a temperature below 550° C. at an average cooling speed higher than 20° C./sec; and taking up the steel plate.

21. A high strength steel plate having a low yield ratio below 0.7 and improved strength-elongation balance and stretch flangeability, said steel plate containing 0.01–0.2% of C, 0.3–2.5% of Mn and 0.01–1.8% of Si and having a triple phase of polygonal ferrite, bainite and martensite, the area ratio of said bainite and martensite phases being 4–45% and 1–15%, respectively, and the area ratio of said bainite phase being greater than that of said martensite phase, said martensite having an average particle size smaller than 6 microns, said steel plate produced by a method comprising subjecting a steel material containing 0.01–0.2% of C, 0.3–2.5% of Mn and 0.01–1.8% of Si to a hot rolling-cooling treatment comprising hot rolling with a finish temperature in the range from point $Ar_3$ to $Ar_1$, followed by air cooling or slow cooling 2–20 seconds from said temperature range;

further cooling the hot-rolled steel plate to a temperature below 50° C. at an average cooling speed higher than 20° C./sec; and taking up the steel plate.

22. The high strength steel plate as set forth in claim 20, wherein said average cooling speed from said hot rolling finish temperature to a temperature in the range of $Ar_3$ to $Ar_1$ is 20°–70° C./sec.

* * * * *